Figure 1:
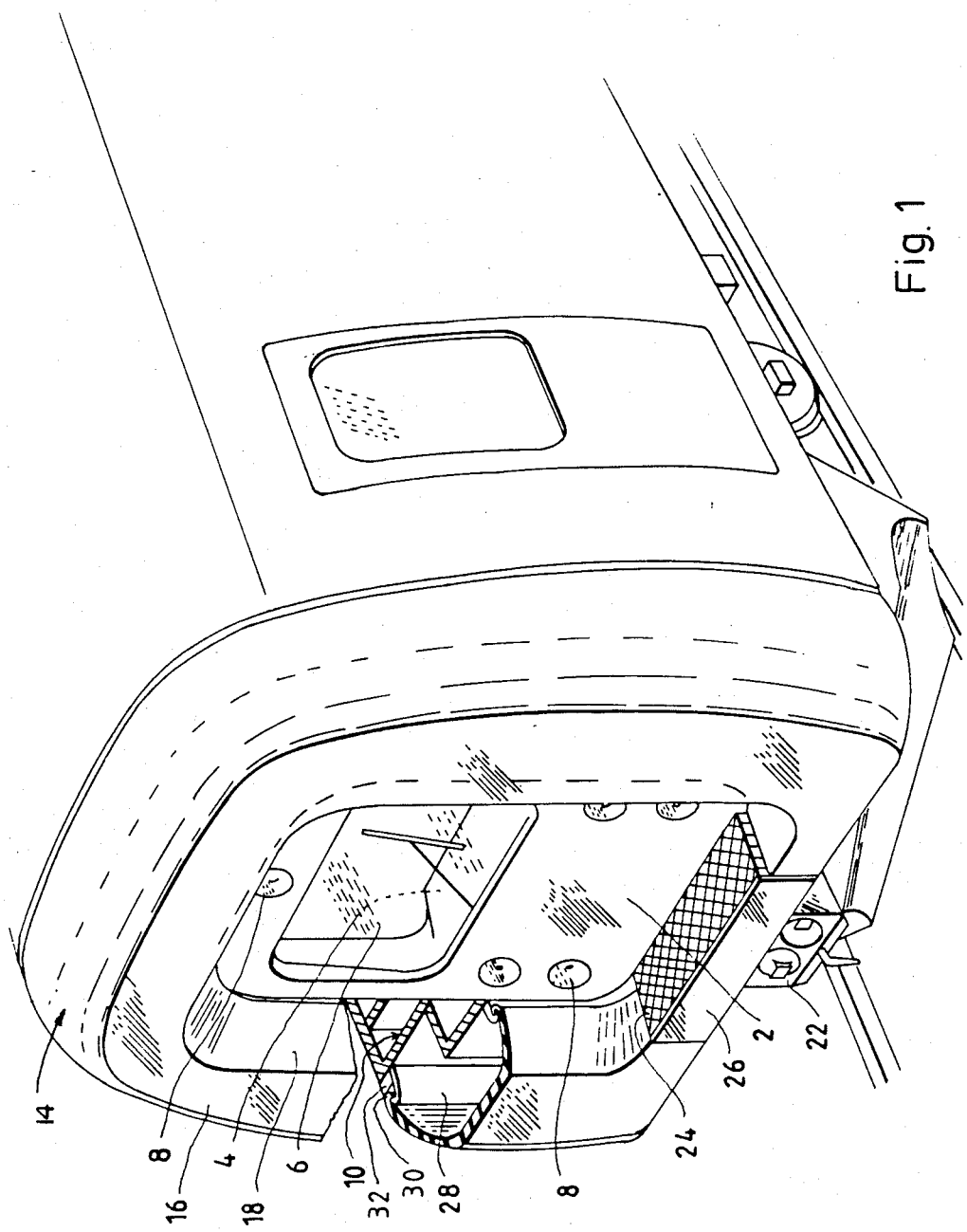

United States Patent [19]

Nielsen

[11] Patent Number: 4,727,814
[45] Date of Patent: Mar. 1, 1988

[54] INTERCHANGEABLE DRIVEABLE LEADING OR TRAILING RAILWAY CAR

[75] Inventor: Jens Nielsen, Copenhagen Ö., Denmark

[73] Assignee: Danske Statsbaner, Copenhagen, Denmark

[21] Appl. No.: 763,398

[22] Filed: Aug. 7, 1985

[51] Int. Cl.⁴ .................. B61D 17/20; B61D 17/02
[52] U.S. Cl. ........................ 105/1.1; 105/11; 105/15; 105/342
[58] Field of Search ............... 105/11, 3, 4, 8, 9, 105/10, 12, 15, 342, 343, 348, 1.3, 329.1

[56] References Cited

U.S. PATENT DOCUMENTS

| | | | |
|---|---|---|---|
| 373,098 | 11/1987 | Sessions | 105/10 |
| 652,049 | 6/1900 | Sprague | 105/342 |
| 722,097 | 3/1903 | Gibbs et al. | 105/342 |
| 1,117,692 | 11/1914 | Newton | 105/342 |
| 2,599,138 | 6/1952 | Stewart | 105/8 R |
| 2,908,229 | 10/1959 | Furrer | 105/3 |
| 3,030,897 | 4/1962 | Barry | 105/8 R |
| 3,182,605 | 5/1965 | Brasher | 105/342 |
| 3,410,226 | 11/1968 | Krupp | 105/10 |
| 4,539,912 | 9/1985 | Hassel et al. | 105/8 R |

FOREIGN PATENT DOCUMENTS

| | | | |
|---|---|---|---|
| 512635 | 7/1952 | Belgium | 105/8 R |
| 808297 | 11/1936 | France | 105/4 |

Primary Examiner—Robert B. Reeves
Assistant Examiner—Glenn B. Foster
Attorney, Agent, or Firm—Sixbey, Friedman & Leedom

[57] ABSTRACT

An inseparable railroad train unit comprises three cars and is adapted for use selectively as a self propelled unit and as an after-coupled unit in a passenger train of the through-passage type. At least the front end of the train unit has a central window equipped door, behind which a driver's desk is provided, and around the door opening is provided a forwardly protruding elastomeric gable member, which provides for an aerodynamically advantageous shape of the front. When the train unit is after-coupled to a similar unit, the driver's desk is stowed away laterally, and the front door is opened for providing the required through passage. The elastomeric gable member now acts as a sealing and shielding element surrounding the passageway between the car and the preceding car.

17 Claims, 7 Drawing Figures

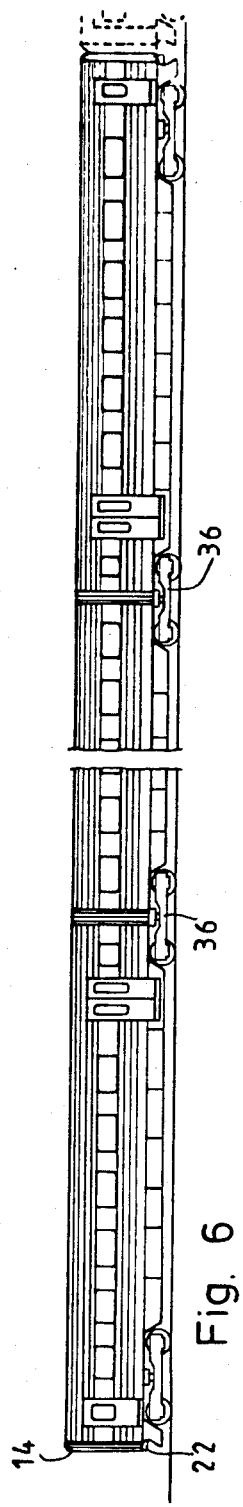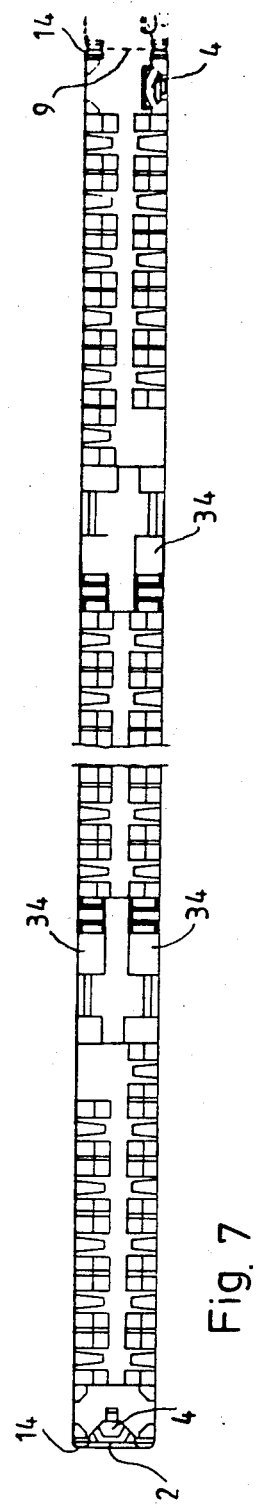
Fig. 6
Fig. 7

INTERCHANGEABLE DRIVEABLE LEADING OR TRAILING RAILWAY CAR

The present invention relates to railroad trains and more particularly to a railroad passenger car, which is applicable both as a leading car of a fast moving train and as an after-coupled car of a train, in which passageways are provided between the consecutive cars. Thus, at least one end of the railcar shall be provided with both a driver's cabin and an openable front door, and to this end it is known from practice to make use of an almost conventional, central door arrangement, while the driver's cabin is located on the top of the front end of the car, i.e. in a streamlined upper projection thereon. This projection adds to the total height of the train in a principally non-desirable manner.

The advantage of this arrangement is that a long train can be split up in two or more self propelled, individual train units of reduced length and that, correspondingly, two or more such units may be coupled together to form one train, whereby the train may be arranged and rearranged in an advantageous manner according to the traffic conditions in a rail network between a center and its surrounding area.

Thus, the leading car as provided with a front door shall be adapted to be after-coupled to another passenger car, and in practice it is an associated condition that the front gable of the car be provided with means operable to form a shielded passageway connection between the car and its preceding car, which latter should preferably have its rear gable designed in a similar manner. Accordingly there should be provided, along or outside the edges of the openable front door opening, forwardly projecting shielding and sealing means, which, together with the corresponding means of the other car, shall form the required shielded passageway when the cars are coupled together and maintain the passageway irrespective of the mutual movements between the two cars or car ends as occurring therebetween during the driving of the train, especially through curves. Hereby it is a necessity that the shielding means show a certain resiliency or yieldability, and it is already known, between rail cars, to make use of sealing and shielding means shaped as protruding soft hose lengths or foldable wall members. However, these known shielding means are in no way adapted to be permanently mounted on the front gable of a fast driving train, and for such a use they would show a very disadvantageous aerodynamical effect.

It is the purpose of the invention to provide a railcar which is well suited to be usable both as a front car of a fast driving train and as an after-coupled car as connected with its preceding car through a shielded passageway.

The railcar according to the invention is defined in the appended claims.

It will be appreciated that in accordance with the invention, as far as the arrangement of the driver's position is concerned, this position may be located right behind the openable front door so as to be operative when the door is closed and be stowed aside when the door is open, thereby leaving the space behind the open door usable as a relevant passageway area. The door, which shall of course be a glass door, at least partly, may thus be located at the middle of the gable without this otherwise showing any separate breakthrough as related to a separate driver's window. This, in turn, means that the front gable surface around the front door, can be designed in an aerodynamically suitable manner, as will be explained in more detail below.

The said forwardly protruding shielding means around the front door, according to the invention, may be integrated with the entire foremost gable surface, inasfar as the latter may be the surface of a resilient body mounted on the rigid, transverse front wall of the car as provided with the front door opening, such that the resilient body as mounted around the door opening projects considerably forwardly of the edge of the door opening, while from this forwardly projecting inner edge area the front surface of the resilient gable element extends all the way outwardly and rearwardly to the surrounding edge area between the said transverse, rigid gable wall of the car and the longitudinal side and top wall portions of the car.

This arrangement accounts for another very important aspect or advantage of the invention, viz. that the said gable element is useful both when it is the front of the train, here because it may show an advantageous aerodynamic shape, and when the car is coupled to another car, here because the gable element itself, due to its resiliency will be additionally usable for constituting the shielding and sealing means about the passageway between the cars, or rather one half of the combined shielding means of the two cars. In other words, the shielding means may be permanently present, also on the front end of the front car, without giving rise to aerodynamic problems.

Figure 2:
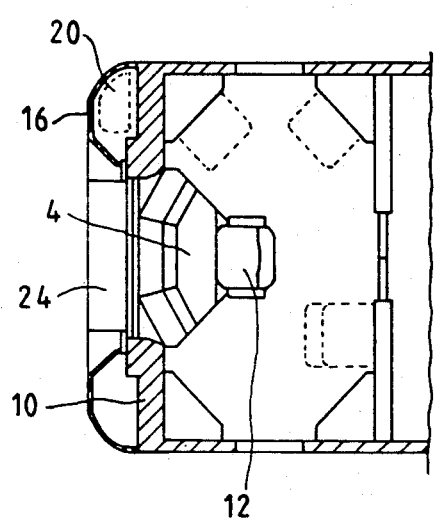
Figure 3:
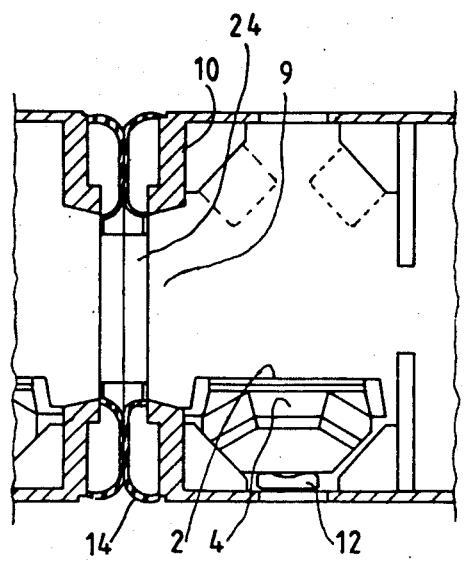
Figure 4:
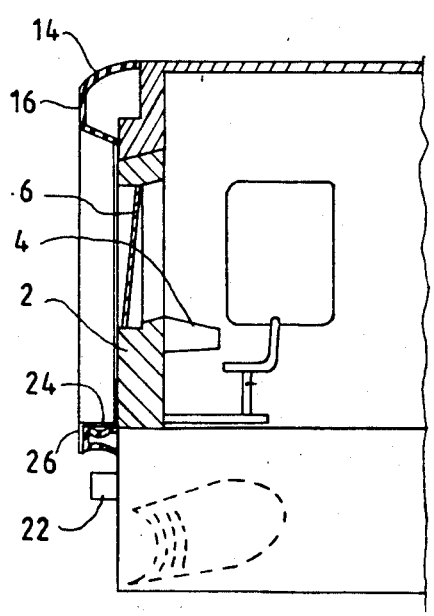
Figure 5:
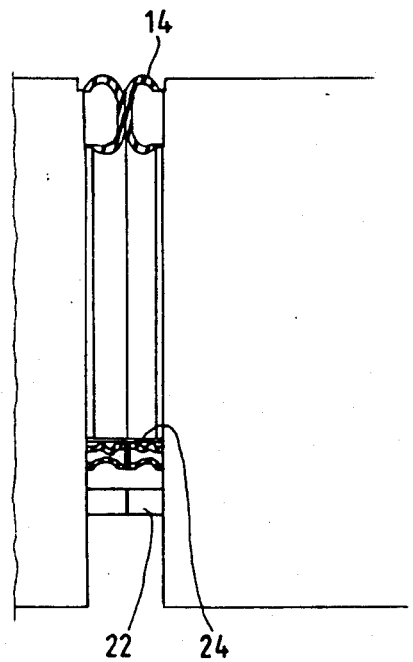

In the following, by way of example, the invention is described in more detail with reference to the drawings, in which:

FIG. 1 is a schematic perspective view, partly in section, of one end of a railroad car according to the invention, FIG. 2 is a sectional view of this front end seen from above, FIG. 3 is a corresponding sectional view, now showing the front end of the railroad car coupled to a preceding car, FIG. 4 is a sectional side view corresponding to FIG. 2, FIG. 5 is a sectional side view corresponding to FIG. 3, FIG. 6 is a general side view of a train unit according to the invention, and FIG. 7 is a schematic top view of this unit illustrating a preferred layout of the train unit of FIG. 6.

In FIG. 1 is shown the front end of the front car of a railroad train. Principally the car may be a special locomotive car, but preferably it is a passenger car, which may be engine equipped. What is important is that the car is a combined front car and through-passage-car, which is provided with an openable front door 2, behind which there is arranged the necessary control equipment 4 for the driver of the train, the door 2 of course being partly or entirely of glass or another transparent material. In FIG. 1 the door 2 is provided with a window 6 and is even used for carrying various lamps and lanterns 8 as required when the car drives as the leading car of a train.

For enabling the car to be used also as an after-coupled through-passage car the control equipment 4 is mechanically arranged so as to be removable from its position just behind the door 2 or the associated door opening, this of course also applying to the associated driver's seat. In a modern train the driver's control equipment is operatively connected with the car through electric wires only, so it is very easy to arrange for the equipment or control desk to be removable; it may be stowed away at any appropriate place, preferably in the car itself.

In a preferred arrangement as shown in FIGS. 1-5 the door 2 is mounted in a door opening 8 (FIG. 3) in a rigid, transverse gable plate structure generally designated 10, and is side hinged in the door opening, whereby the door is openable to the position shown in FIG. 3. Between the opened door and the adjacent outside of the car is hereby confined a space, which is not particularly useful, but it is ideal just for receiving the driver's desk and chair. There are two convenient manners in which the driver's equipment can be moved into this position, viz. (1) the equipment can be arranged transversely slidably on the car floor such that it can be pushed into the side position before the door is opened and back again when the door has been closed, or (2) the equipment can be mounted in a direct mechanical connection with the door so as to simply be swung aside, behind the door, when the door is opened, this being the preferred arrangement, which is illustrated in FIGS. 2 and 3, where the driver's seat is designated 12.

On the front end of the car is mounted a shell element 14 of an elastomeric material. Generally this element projects from the outer edge area of the rigid front wall structure 10 forwardly and inwardly to a foremost sealing area 16, which is located in front of the edge of the door opening 8. From the area 16 the shell material continues rearwardly and slightly inwardly as a frame portion 18 secured to the front wall structure 10 adjacent the edge of the door opening 8 therein.

It is important that the forwardly exposed surface of the shell member extends from the area 16 outwardly and rearwardly with a cross sectional curvature as providing for an advantageous aerodynamic shape of the front end of the car. It is here considered to be a basic condition that the transition curvature between the front surface and the side and roof surfaces of the car should have a radius of at least one tenth of the width of the car for avoiding a pronounced turbulence of the speed wind along the car sides, and it will be appreciated that the desired shape of the exposed front surface is easy to realize through the use of an e.g. moulded shell member 14.

The elastomeric shell member 14 is dimensioned such that the front area 16 is located with sufficient longitudinal spacing from the rigid front wall structure 10 to be able to seal against a similar front (or rear) area 16 of the shell member 14 of another car, when the two cars are coupled together, see FIGS. 3 and 5. Hereby the area 16 should be urged resiliently towards the rigid front wall 10 sufficiently to ascertain the sealing to be maintained even when the train moves through curves. It will be possible, however, to support the sealing by introducing compressed air into the space behind the shell member 14. On the other hand the sealing pressure between the areas 16 should not be too high, as the juxtaposed areas 16 should preferably be able to slide laterally on each other when the two car ends carry out mutual transverse movements. To facilitate such sliding the sealing areas 16 may be provided with a foremost frame or plating element, e.g. made of metal, which will secure an easy transverse slidability while maintaining a good sealing action against a similar frame element of the other car. Alternatively the cooperating sealing areas 16 should have interengaging holding means to prevent such sliding, whereby the mutual transverse movements are to be taken up by resilient deformations of the respective gable elements 14.

When two cars are coupled together the gable elements 14 may be resiliently deformed so as to lose their optimal aerodynamic shape, but this is of course unimportant, when the shape is only restored by a later separation of the cars.

When the gable element 14 is reasonably easily compressible for sealing purposes in connection with the coupling together of two cars, this ability may be undesired when the car end is the leading end of the train, because the speed wind pressure at high velocity, e.g. 160 km/h, may then cause the element to be deformed out of its aerodynamic shape. The already mentioned possibility of introducing compressed air behind the gable element 14, therefore, is of particular relevance in this situation, where the correct aerodynamic shape may be secured by inflation of the gable element. This element, of course, should consist of a substantially non-stretchable material such that it is not excessively deformed by the interior air pressure when the train slows down. However, it will be possible to make use of automatic control means for regulating the interior pressure in accordance with the outer dynamic pressure.

A further possibility is that the gable element 14 can be designed with such a shape and character that in its free condition it protrudes from the rigid car end more than corresponding to its desired aerodynamic shape, while for an increasing air resistance it is pressed back into the desired shape, which may then be stabilized with the use of a rigid or semi rigid filler body of an inflatable element behind the shell element 14, such an element being shown in dotted lines and designated 20 in FIG. 2. When compressed air is to be used behind the shell element it will be practical, generally, to make use of an inflatable filler element 20, since the shell element should not, then, be secured to the rigid car end in an air tight manner. The same is true if the shell element is made as a hollow body with an air tight rear side to be placed against the rigid end wall structure 10.

It will be within the scope of the invention to replace the entire shell element 14 by a block element made of a suitably resilient foam material with a tight surface. Both a shell and a block element may be built up as a unitary element or in sections.

The inner frame wall portion 18 of the element 14 may be designed so as to be outwardly tiltable in response to the sealing area 16 being forced towards the rigid front wall structure 10, but alternatively the wall portion 18 may instead be bendable or pliable or bulge inwardly as shown in FIGS. 3 and 5.

Preferably the car is provided with a coupling 22 of the automatic type, whereby the coupling together of two cars and the establishing of the shield around the passageway between the cars can take place in a fully automatical manner. Particularly from FIG. 4 it will be noted that the front end of the coupling 22 is located spaced somewhat behind the front plane of the gable element 14, such that a desired compression of the latter is obtained whenever the car end is coupled together with a preceding or following car of a similar type. It should be remarked that by the coupling together of the cars it is of course necessary to provide for a gangway connection between the lower edges of the opposed door openings, but such a connection is easy to establish in various ways, also fully automatically, and it is not the purpose of this invention to disclose such an arrangement in more detail. However, a practical gangway arrangement is illustrated in FIGS. 1, 4 and 5, where it is shown that a gangplate 24 may be arranged protruding from the front wall structure 10 underneath the door, carried by the lower part of the gable member 14 and having an outermost, depending plate portion 26. When the car is coupled together with a similar car the gangplate 24 of either car may be pushed inwardly, e.g. into a suitable receiver recess, or the gangplate 24 may be of a longitudinally resilient compressible design, e.g. as a foldable latticework or made of welled rubber strips. Thus, even if the gangplate 24 is not entirely stiff it will still be carried safely on the lower part of the gable element 14, and besides the outer depending plate 26, when forced against a similar plate of an adjacent car, will stabilize the gangplate 24 for its intended use.

The gable element 14 may be secured to the front end wall structure 10 in any suitable manner. In FIG. 1 it is shown by way of example that the wall structure 10 is provided with forwardly projecting hook profile members 28, which receive respective rear bead edges 30 of the element 14, these bead edges being releasably anchored to the hook members 28 by means of holding cleats 32 secured by screws to the respective side portions of the hook profile members 28.

FIGS. 6 and 7 show a train unit comprising three cars, of which the two end cars are provided with the discussed gable element 14 at their free ends, while the cars are coupled together in any appropriate manner. Such a train unit may constitute a basic unit, which is adapted to be coupled together with (and be separated from) one or more similar units. The two similar end cars are special by having the discussed gable element at their free ends, and by having all required special installations such as engines, toilets, catering compartments etc., while the middle car as illustrated in FIG. 7 is special by being equipped principally solely with passenger seats and associated equipment such as tables and luggage shelves. This layout of the train unit is very advantageous from a production point of view, because the middle cars can be equipped by an enterprise specialized in furniture mounting only, while the end cars, before or after their being equipped with the relevant furniture, may be provided with the more special equipment by another enterprise handling toilet installations etc.

Traditionally, railroad cars for long distance trains have been equipped with at least one toilet at both ends as a standard, and it is a novel and advantageous concept to omit the toilets from a middle car between two end cars of a triple train unit, in which toilets are provided in the end cars next to the opposite ends of the middle car. Normally the provision of one toilet at each end of each car will represent an overcapacity, and the arrangement according to the invention offers a more reasonable capacity and an associated important saving of production costs.

As suggested by FIG. 6 the said middle car may even be produced without any kind of side doors, inasfar as the access to the middle car is conveniently established through side doors solely in the respective innermost end portions of the end cars. At each innermost end portion of these cars may be provided one or two toilets 34 or one toilet and one other compartment for luggage or for catering equipment or otherwise for official use. Even purely technically it will be advantageous to make use of such a short train unit as a basic unit in longer trains, besides the ability of these short units to be isolated for as independent self propelled trains of short length for use in passenger poor areas, e.g. in that the middle and end cars may share common wheel bogies 36, as illustrated in FIG. 6.

It will be appreciated that the train unit should not necessarily comprise just three cars, as the number of cars may be both higher and lower.

What is claimed is:

1. A railroad car for use selectively as a leading car and as an after-coupled through-passage car, comprising a front gable, a driver's compartment behind the front gable, an openable front door in a front door opening in the front gable, and shielding means arranged generally in front of at least the side and top edges of said door opening so as to be operable to form, together with similar shielding means of another car, a shielded passageway between the cars, characterized in that the driver's compartment is constituted by the space immediately behind the said front door, which is at least partially transparent, and that the driver's control equipment is located in a movable unit, which is shiftable between an operative position wherein the front door is closed and the movable unit is disposed just behind the closed front door and an inoperative position wherein the front door is opened to form said passageway and the movable unit is stowed away at a location where it is removed from said passageway behind the front gable to form a generally unobstructed walkway through the passageway.

2. A railroad car according to claim 1, in which the control equipment unit is laterally displaceable.

3. A railroad car according to claim 1, in which the control equipment unit is associated with the door.

4. A railroad car according to claim 3, in which the door is a unitary side hinged door, and in which the control equipment is coupled with the door so as to be swingable along with the door.

5. A railroad car according to claim 1, and provided with sealing and shielding means protruding forwardly from the edge area of the said door opening, characterized in that a gable covering element of elastomeric material is mounted in front of a rigid gable plate, in which the door opening is provided, so as to be connected with the outer edge area of the rigid gable plate and extend therefrom inwardly and forwardly to an advanced sealing area substantially just in front of the edge area of the door opening.

6. A railroad car according to claim 5, in which the gable covering element is designed with an aerodynamically optimized outer shape, from which the element is compressible when used for forming a shielded passageway between two intercoupled cars.

7. A railroad car according to claim 5, in which the gable covering element is an elastomeric or flexible shell element.

8. A railroad car according to claim 7, in which means are provided for introducing compressed air into the space between the shell element and the rigid gable plate or into an inflatable member as mounted in this space.

9. A railroad car according to claim 5, in which the gable covering element is made of a resiliently compressible block material such as a foam material.

10. A railroad car according to claim 5, in which the gable covering element is provided with internal rigid or semi rigid material portions for limiting the compressibility of the element.

11. A railroad train unit comprising three intercoupled cars, of which the free ends of the two end cars are equipped as claimed in claim 5, wherein the middle car is supported by two wheel bogies at each end thereof, these bogies being arranged immediately underneath the intercoupling area between the respective end of the middle car and the associated end of the respective end car, these two cars thus sharing a single bogie.

12. A train unit comprising three intercoupled cars, of which the free ends of the two end cars are equipped as claimed in claim 5, wherein the middle car is equipped with passenger seating equipment practically all over its length, while the toilets of the train unit are placed solely in those end portions of the end cars, which are intercoupled with the middle car.

13. A train unit according to claim 2, wherein the sides of the middle car are doorless.

14. A railroad car according to claim 1, wherein said shielding means has a foremost sealing area disposed forwardly of the door opening and serving as a means for sealingly mating against a foremost sealing area of said similar shielding means of another car and wherein said sealing area is connected to a front end wall of the car by wall portions of the shielding means extending rearwardly between the sealing area and said front end wall, and wherein, to provide an aerodynamically optimized shape, one of said wall portions forms a transitional curvature between said sealing area and side and roof surfaces of the car for avoiding pronounced turbulence of wind passing along the car.

15. A railroad car according to claim 14, wherein said transitional curvature has a radius of at least one tenth of the width of the car.

16. A railroad car according to claim 15, wherein the other of said wall portions extends rearwardly and inwardly from said sealing area to the front end wall of the car adjacent the perimeter of the door opening so as to form a frame portion about said door opening.

17. A railroad car according to claim 14, where in the other of said wall portions extends rearwardly and inwardly from said sealing area to the front end wall of the car adjacent the perimeter of the door opening so as to form a frame portion about said door opening.

* * * * *